UNITED STATES PATENT OFFICE.

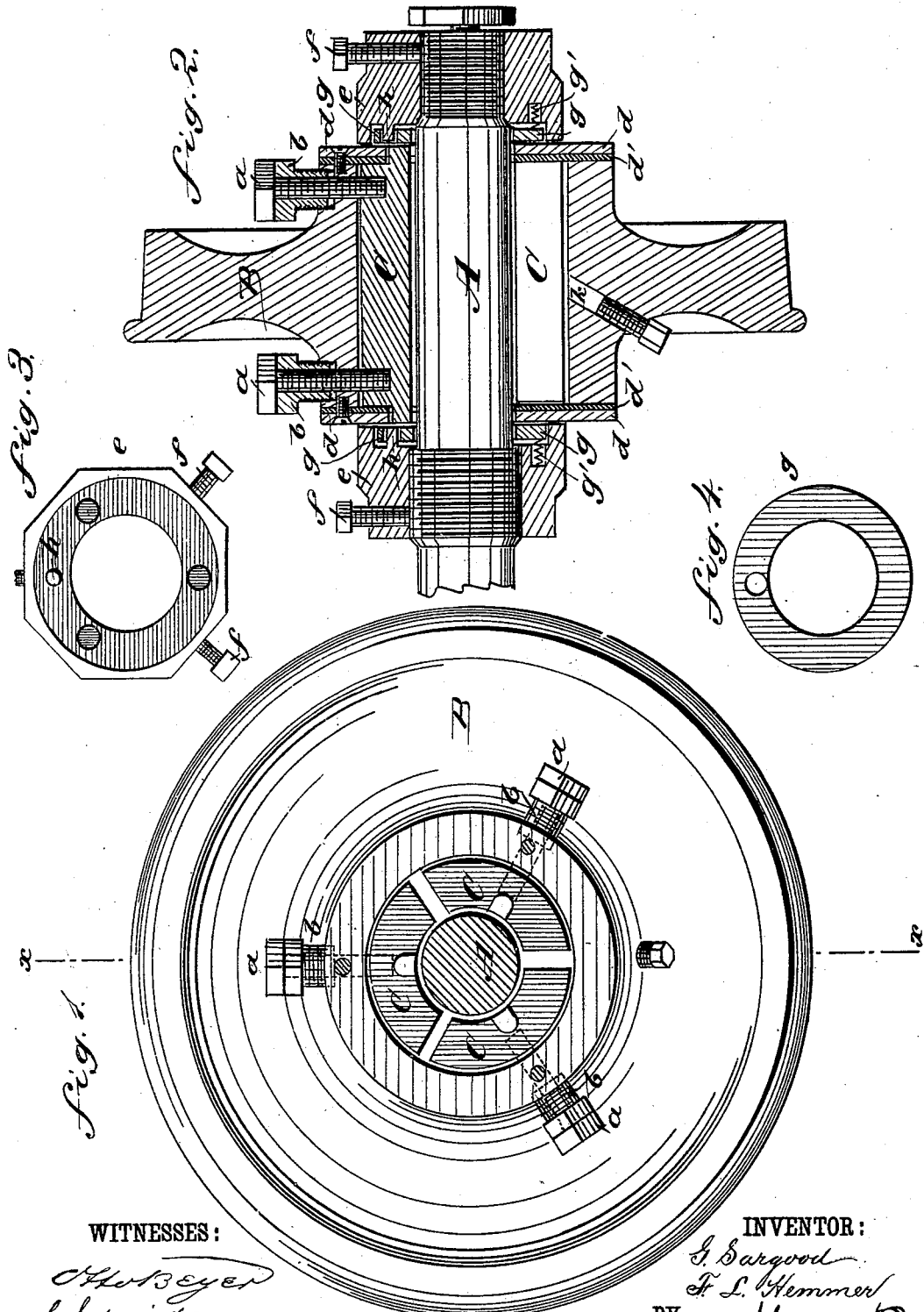

GEORGE SARGOOD AND FREDERICK L. HEMMER, OF EAST ARLINGTON, VT.

JOURNAL-BOX.

SPECIFICATION forming part of Letters Patent No. 276,195, dated April 24, 1883.

Application filed September 15, 1882. (No model.)

*To all whom it may concern:*

Be it known that we, GEORGE SARGOOD and FREDERICK LOUIS HEMMER, of East Arlington, in the county of Bennington and State of Vermont, have invented certain new and useful Improvements in Journal-Boxes, of which the following is a full, clear, and exact description.

Our invention relates to boxes for car-wheels and loose pulleys; and it consists in an adjustable and air-tight box in which provision is made for adjusting the bearings as the axle wears, and the air is excluded from the box, so as to prevent gumming of the oil, as hereinafter described and claimed.

Reference is to be had to the accompanying drawings, forming a part of this specification, in which similar letters of reference indicate corresponding parts in all the figures.

Figure 1 is a partly-sectional side elevation of a car-wheel and box of our improved construction. Fig. 2 is a section on line $xx$, Fig. 1. Fig. 3 is a face view of one of the clamping-nuts. Fig. 4 is a face view of the packing collar or ring.

A is the axle.

B is the wheel, the hub of which is provided with an aperture somewhat larger in diameter than the axle.

C C C are segmental bearing-blocks fitted around the axle and within the wheel-hub.

$a\ a$ are adjusting-screws passing radially through the hub of the wheel, and extending into the bearing-blocks C, so as to allow of the adjustment of the blocks to and from the axle.

Upon the screws $a$ are fitted hollow set-screws $b$, which enter the hub and serve to prevent the screws $a$ from being forced inward by any jarring action.

$d\ d$ are ring-shaped cap-plates, attached by screws to the hub of the wheel, and serving to retain the bearing-blocks in place.

Suitable packing-rings, $d'$, are placed beneath the plates $d$, so as to form an air-tight joint.

E E are nuts taking upon screws formed upon the axle at each end of the hub, and bearing upon the plates $d$. These nuts are clamped by set-screws $f$, and their inner faces are recessed to receive the packing-rings $g$, which are forced against the plates $d$ by springs $g'$, inserted in recesses in the faces of the nuts, so that the joint is tightly packed and the escape of the oil prevented. Lugs $h$, formed on the nuts, enter apertures in the rings $g$, so as to prevent their rotation. This construction serves to bring the wear upon the rings $g$.

Oil is to be supplied to the box through an opening, $k$, formed in the hub of the wheel, and the opening is afterward plugged to prevent the escape of the oil.

A box constructed in this manner is air-tight, so that the oil cannot work out nor air enter. Waste of oil is thus prevented, and the oil will not be gummed by the action of the atmosphere. The bearing can be set up to compensate for the wear, and in case the bearing has become worn, so that the running of the wheel is not true, the box can be adjusted to remedy this defect.

Having thus described our invention, we claim as new and desire to secure by Letters Patent—

1. In journal-boxes, the adjustable bearing-blocks C, the ring-plates $d$, and clamping-nuts $e$, combined with the wheel B and axle A, substantially as shown and described.

2. In journal-boxes, the cap-plates $d$, provided with packing, combined with the wheel B and bearing-blocks C, substantially as shown and described.

3. The adjusting-screws $a$ and set-screws $b$, in combination with the wheel B and bearing-blocks C, as and for the purposes set forth.

4. The packing-rings $g$, in combination with the clamping-nuts E, the bearings C, and cap-plates $d$, substantially as and for the purposes set forth.

5. The combination of apertured packing-rings $g$, springs $g'$, nuts $e$, having studs $h$, bearing-blocks C, and cap-plates $d$, substantially as shown and described.

GEORGE SARGOOD.
FREDERICK L. HEMMER.

Witnesses:
I. W. MARBLE,
A. L. GREGORY.